3,845,188
PROCESS FOR THE RECOVERY OF GROUP I–B METAL HALIDES FROM BIMETALLIC SALT COMPLEXES

David G. Walker, Baytown, and Donald J. Haase, Houston, Tex., assignors to Tenneco Chemicals, Inc.
No Drawing. Filed Sept. 17, 1973, Ser. No. 398,148
Int. Cl. C01g 5/00, 3/04, 7/00
U.S. Cl. 423—42                                                7 Claims

ABSTRACT OF THE DISCLOSURE

Group I–B metal halides are recovered from bimetallic salt complexes having the generric formula $$M_I M_{II} X_n \cdot \text{Aromatic}$$

wherein $M_I$ is a Group I–B metal, $M_{II}$ is a Group III–A metal, X is halogen, $n$ is the sum of the valences of $M_I$ and $M_{II}$, and Aromatic is a monocyclic aromatic hydrocarbon having 6 to 12 carbon atoms by contacting a solution of the bimetallic salt complex in an aromatic hydrocarbon with anhydrous ammonia. The Group I–B halide, which precipitates quantitatively from the solution, is readily separated from the $NH_3:M_{II}$ halide complex which remains in solution. This process can be used, for example, to recover anhydrous cuprous chloride from the cuprous aluminum tetrachloride toluene complex.

---

This invention relates to a process for recovering Group I–B metal halides from bimetallic salt complexes having the generic formula $$M_I M_{II} X_n \cdot \text{Aromatic}$$

wherein $M_I$ is a Group I–B metal, $M_{II}$ is a Group III–A metal, X is halogen, $n$ is the sum of the valences of $M_I$ and $M_{II}$, and Aromatic is a monocyclic aromatic hydrocarbon having 6 to 12 carbon atoms. More particularly, it relates to a process for recovering cuprous chloride from the $CuAlCl_4 \cdot$toluene complex.

Bimetallic salt complexes that have the generic formula $$M_I M_{II} X_n \cdot \text{Aromatic}$$

are known to be useful in the separation from gas mixtures of such complexible ligands as olefins, acetylenes, aromatics, and carbon monoxide. For example, in U.S. Pat. No. 3,651,159, Long et al. disclosed a process in which a sorbent solution of cuprous aluminum tetrahalide in toluene was used to separate ethylene, propylene, and other complexible ligands from a feed stream. The complexed ligands were recovered by ligand exchange with toluene. The resulting solution of cuprous aluminum tetrahalide·toluene in toluene was recycled and used to separate additional quantities of the complexible ligands from the feed stream. Walker et al. in U.S. Pat. 3,647,843, disclosed a process in which a hydrocarbon pyrolysis gas stream was contacted with a cuprous aluminum tetrachloride solution in toluene to separate acetylene from the gas stream as a solution of the complex $$HC{\equiv}CH \cdot CuAlCl_4$$

in toluene. Acetylene was stripped from this complex, and the cuprous aluminum tetrachloride·toluene complex was recycled.

In processes such as those disclosed by Long et al. and Walker et al. in which a liquid sorbent containing a bimetallic salt complex is recycled without purification and used for long periods of time, there is a gradual increase in the amounts of reaction by-products and other impurities in the liquid sorbent until there is sufficient impurity present to interfere with the effective operation of the process. For example, any Group III–A halide, such as aluminum chloride, that is present undergoes alkylation and polymerization, and small amounts of water, hydrogen sulfide, and olefins react with the bimetallic salt complex to form complexes that are insoluble in the cold sorbent. When the liquid sorbent contains amounts of these and other contaminants that are sufficient to coat heat exchangers, clog lines, and otherwise foul the equipment, it must be replaced by fresh solvent.

Because of its high metal content, the spent liquid sorbent cannot be discharged into sewers or waste ponds without causing serious pollution problems. In addition, it is economically desirable to recover the Group I–B metal, usually copper, which is the most costly component of the sorbent.

Several processes have been used for the recovery of Group I–B metals from the liquid sorbents that contain the bimetallic salt complex $$M_I M_{II} X_n \cdot \text{Aromatic}$$

but none has proven to be satisfactory. In one such process, water is added to the liquid sorbent to cause the precipitation of a mixture of the metal halide and hydrolyzed bimetallic salt complex. Because of the difficulties involved in separating pure dry metal halide from the precipitate, this process is impractical to carry out on an industrial scale. Other recovery processes yield the Group I–B metal, which must be converted to its halide before it can be reused in the preparation of the bimetallic salt complex.

In accordance with this invention, it has been found that Group I–B metal present in the $$M_I M_{II} X_n \cdot \text{Aromatic}$$

complex in a liquid sorbent can be recovered quantitatively as its halide by contacting the liquid sorbent with anhydrous ammonia. The Group I–B metal halide, whose solubility in the sorbent is less than about 0.5 mole percent at ambient temperature, precipitates and can be recovered quantitatively from the sorbent.

The liquid sorbents that are treated by the process of this invention are solutions of a bimetallic salt complex in an aromatic hydrocarbon. The bimetallic salt complexes have been defined hereinbefore as having the generic formula $$M_I M_{II} X_n \cdot \text{Aromatic}$$

$M_I$ is a Group I–B metal; that is, copper, silver, or gold. Copper (I) is the preferred metal. $M_{II}$ is a Group III–A metal, that is, boron, aluminum, gallium, indium, or thallium. Aluminum and boron are the preferred metals, aluminum being particularly preferred. X is halogen, i.e., fluorine, chlorine, bromine, or iodine; it is preferably chlorine or bromine. The sum of the valences of $M_I$ and $M_{II}$ is represented by $n$. Aromatic is a monocyclic hydrocarbon having 6 to 12 carbon atoms, and preferably 6 to 9 carbon atoms, such as benzene, toluene, ethylbenzene, xylene, mesitylene, chlorobenzene, chlorotoluene, or chloroxylene. It is preferably toluene. Illustrative of these bimetallic salt complexes are the following:

| | |
|---|---|
| $CuBF_4 \cdot$benzene, | $AgAlBr_4 \cdot$benzene, |
| $CuBCl_4 \cdot$benzene, | $CuGaCl_4 \cdot$toluene, |
| $AgBF_4 \cdot$mesitylene, | $CuInI_4 \cdot$chlorobenzene, |
| $AgBBr_4 \cdot$xylene, | $CuThI_4 \cdot$p-chlorotoluene, |
| $AgAlCl_4 \cdot$xylene, | and the like. |

The preferred bimetallic salt complexes are $$CuAlCl_4 \cdot \text{toluene and } CuAlBr_4 \cdot \text{toluene.}$$

The aromatic hydrocarbon in which the bimetallic salt complex is dissolved is usually and preferably the same as that used in the preparation of the bimetallic salt complex, but if desired it may be a different one. The total amount of aromatic hydrocarbon in the liquid sorbent, that is the amount in the bimetallic salt complex plus the amount used as solvent, is at least 10 mole percent of the amount of the bimetallic salt $M_IM_{II}X_n$ that is present. It is preferred that the amount of aromatic hydrocarbon be 100 to 250 mole percent of the amount of the bimetallic salt. In most cases the liquid sorbents contain 25 to 75 percent by weight of $CuAlCl_4$·toluene in toluene.

In a preferred embodiment of the invention, cuprous chloride is recovered from a liquid sorbent that is a solution of $CuAlCl_4$·toluene in toluene. In this process, the liquid sorbent is treated with an amount of anhydrous ammonia that is stoichiometrically equivalent to the amount of copper in the sorbent. Anhydrous cuprous chloride, which is substantially insoluble in the sorbent, is precipitated quantitatively, while the by-product $NH_3:AlCl_3$ complex remains in solution. The precipitated cuprous chloride is separated from the liquid sorbent and washed with an aromatic hydrocarbon, such as toluene or benzene, to remove occluded liquid sorbent, tars, and other contaminants from it. The washed cuprous chloride can be used without further purification in the preparation of fresh liquid sorbent. This can be done by adding the recovered cuprous chloride to a slurry of aluminum chloride in toluene and stirring the resulting mixture until a solution of cuprous aluminum tetrachloride·toluene in toluene is obtained.

The reaction by which cuprous chloride is separated from the bimetallic salt complex $CuAlCl_4$·toluene may be represented by the following equation:

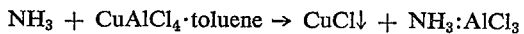

in toluene. This reaction, which is irreversible, proceeds quantitatively when anhydrous ammonia is added to the solution of $CuAlCl_4$·toluene in toluene.

The complex $NH_3:AlCl_3$ that is formed is completely soluble in toluene and remains in solution. Aluminum chloride can be recovered from this complex, but for reasons of economy, the $NH_3:AlCl_3$ is usually separated from the toluene and discarded.

The conditions under which this process is carried out are not critical. The treatment of the liquid sorbent with anhydrous ammonia can be effected at temperatures between about −25° C. and the boiling point of the aromatic hydrocarbon at pressures between about 0.01 atmosphere and 10 atmospheres. It is usually and preferably carried out under ambient conditions by bubbling anhydrous ammonia through the liquid sorbent. The sorbent may be stirred to facilitate the mixing of the liquid and vapor phases.

The amount of anhydrous ammonia that is added to the liquid sorbent is that which will cause the precipitation of the desired amount of copper from the sorbent. When the process is used to recover copper from spent $CuAlCl_4$·toluene in toluene, the amount of anhydrous ammonia that is added to the liquid sorbent is that which is stoichiometrically equivalent to the amount of copper that is present. A small excess of ammonia can be used to insure that all of the copper is precipitated as cuprous chloride. When it is desired to remove only a portion of the copper from the liquid sorbent, the amount of ammonia used is reduced to that which is equivalent to the amount of copper that is to be removed from the sorbent.

The invention is further illustrated by the following examples.

EXAMPLE 1

(A) A liquid sorbent that contained 28.6 mole percent of cuprous aluminum tetrachloride and 71.4 mole percent of toluene was prepared by adding 1.1 moles of cuprous chloride to 1 mole of anhydrous aluminum chloride in toluene. The resulting solution was filtered to remove unreacted cuprous chloride and insoluble impurities from it.

(B) A gas mixture obtained by the pyrolysis of natural gas had the following composition:

|  | Mm. |
|---|---|
| Hydrogen | 560 |
| Carbon monoxide | 280 |
| Acetylene | 75 |
| Methane | 60 |
| Carbon dioxide | 25 |

The pyrolysis gas was fed at ambient temperature and 19 p.s.i.a. pressure to an absorption column in which it was contacted with an amount of the liquid sorbent of Example 1A that contained at least sufficient cuprous aluminum tetrachloride to react with all of the acetylene and carbon monoxide in the feed gas. The acetylene and carbon monoxide in the gas mixture reacted with the liquid sorbent as it traveled through the column to form a solution that contained the acetylene-cuprous aluminum tetrachloride complex and the carbon monoxide-cuprous aluminum tetrachloride complex. This solution was fed to a stripping column in which it was brought into contact with benzene vapor at 80° C. The mixture of benzene vapor and carbon monoxide that left the column was cooled to 25° C. to separate the carbon monoxide from the benzene. The sorbent solution which then contained cuprous aluminum tetrachloride and the acetylene-cuprous aluminum tetrachloride complex was fed to a stripping column in which it was brought into contact with benzene vapor at 95° C. The vapor that left the column was cooled to condense the benzene and separate it from the acetylene. The stripped sorbent was returned to the absorption column where it reacted with additional amounts of carbon monoxide and acetylene in the gas stream.

(C) After it had been used for several months in the process described in Example 1B, the liquid sorbent which contained polymeric impurities and other impurities that interfered with its use in the removal of carbon monoxide and acetylene from the gas stream was replaced by fresh liquid sorbent.

(D) The spent solvent was stirred at ambient temperature while anhydrous ammonia was bubbled through it. The precipitation of cuprous chloride was observed shortly after the addition of ammonia was begun. The addition of ammonia was continued until the amount added was stoichiometrically equivalent to the amount of copper in the spent sorbent. The precipitated cuprous chloride was separated by filtration and washed with toluene to remove occluded spent sorbent. There was a substantially quantitative recovery of copper (as cuprous chloride) from the spent sorbent.

The wet cuprous chloride was mixed with a slurry of anhydrous aluminum chloride in toluene by the procedure described in Example 1A to form a solution of cuprous aluminum tetrachloride·toluene in toluene that was used as the liquid sorbent in the process of Example 1B.

EXAMPLE 2

A solution of $CuAlCl_4$·toluene in toluene which had been used as the liquid sorbent in the process of Example 1B for several months contained 2.12 mmol./ml. of copper and 2.12 mmol./ml. of aluminum. To a portion of this solution was added about half the amount of ammonia required to react with the $CuAlCl_4$ in it. After removal of the precipitated cuprous chloride, the solution was found to contain 1.04 mmol./ml. of copper, 2.05 mmol./ml. of aluminum, and 0.98 mmol./ml. of ammonia, which indicated that the solution contained about half its original $CuAlCl_4$ content and an equivalent amount of $NH_3:AlCl_3$.

The process of this invention can also be used to separate Group I–B metal halides from solutions that contain each of the other bimetallic salt complexes disclosed herein.

What is claimed is:

1. The process for the recovery of Group I–B metal halide from a liquid sorbent that is a solution in an aromatic hydrocarbon of a bimetallic salt complex having the formula $$M_I M_{II} X_n \cdot Aromatic$$

wherein $M_I$ is a Group I–B metal, $M_{II}$ is a Group III–A metal, X is halogen, $n$ is the sum of the valences of $M_I$ and $M_{II}$, and Aromatic is a monocyclic aromatic hydrocarbon having 6 to 12 carbon atoms that comprises contacting the liquid sorbent with anhydrous ammonia, thereby forming a reaction product that consists essentially of solid $M_I$ halide and a solution of $NH_3:M_{II}$ halide in the aromatic hydrocarbon, and separating the $M_I$ halide from said reaction product.

2. The process for the recovery of cuprous chloride from a liquid sorbent that is a solution in an aromatic hydrocarbon of a bimetallic salt complex having the formula $$CuAlX_4 \cdot Aromatic$$

wherein X is halogen and Aromatic is a monocyclic aromatic hydrocarbon having 6 to 9 carbon atoms that comprises contacting said sorbent with anhydrous ammonia, thereby forming a reaction product that consists essentially of solid cuprous halide and a solution of $NH_3:AlX_3$ in the aromatic hydrocarbon, and separating the cuprous halide from said reaction product.

3. The process of Claim 2 wherein the bimetallic salt complex has the formula $$CuAlCl_4 \cdot Aromatic$$

4. The process of Claim 2 wherein the liquid sorbent is a solution of $CuAlCl_4 \cdot toluene$ in toluene.

5. The process of Claim 2 wherein the amount of ammonia that is added is that which is stoichiometrically equivalent to the amount of copper in the bimetallic metal salt complex.

6. The process of Claim 2 wherein the liquid sorbent is contacted with ammonia at a temperature between −25° C. and the boiling point of the aromatic hydrocarbon at a pressure between 0.01 atmosphere and 10 atmospheres.

7. The process of Claim 2 wherein the liquid sorbent is contacted with ammonia under ambient conditions.

References Cited
UNITED STATES PATENTS 3,651,159   3/1972   Long et al. _____ 423—493

EDWARD STERN, Primary Examiner

U.S. Cl. X.R.

423—463, 493